United States Patent
Ham

(10) Patent No.: US 6,626,250 B1
(45) Date of Patent: Sep. 30, 2003

(54) ICE AUGER SHROUD SYSTEM

(76) Inventor: Todd J. Ham, 1569 Hwy. 9 North, Glyndon, MN (US) 56547

( * ) Notice: Subject to any disclaimer, the term of this patent is extended or adjusted under 35 U.S.C. 154(b) by 0 days.

(21) Appl. No.: 10/123,799

(22) Filed: Apr. 12, 2002

(51) Int. Cl.[7] .................................................. F25C 5/04
(52) U.S. Cl. ............................................ 175/18; 299/24
(58) Field of Search ........................... 125/18; 299/24; 408/241 R

(56) References Cited

U.S. PATENT DOCUMENTS

| | | | |
|---|---|---|---|
| 1,857,585 A | 5/1932 | Brooks, Sr. | |
| 2,723,835 A | 11/1955 | Reese et al. ................... | 255/19 |
| 3,025,917 A | 3/1962 | Knoblauch ................... | 175/18 |
| 3,382,935 A | 5/1968 | Watts .......................... | 175/313 |
| 4,497,184 A * | 2/1985 | Utter et al. .................... | 62/354 |
| 4,539,750 A | 9/1985 | Jarvi et al. .................... | 30/300 |
| 4,854,396 A | 8/1989 | Burch .......................... | 175/18 |
| 4,947,943 A * | 8/1990 | Litwak .......................... | 175/18 |
| 5,330,014 A | 7/1994 | Wagner ....................... | 175/18 |
| 5,873,419 A | 2/1999 | Berry et al. ................... | 175/18 |
| 6,076,617 A | 6/2000 | Berner .......................... | 175/18 |

* cited by examiner

Primary Examiner—William Neuder

(57) ABSTRACT

An ice auger shroud system for directing debris produced during the drilling of an ice hole in a controlled direction from the operator. The ice auger shroud system includes a shroud member comprised of an elongate tubular structure having a first end and a second end, a side opening within the shroud member, a handle attached to the shroud member, a first strap and a second strap attached to the upper end of the shroud member, an elongate protective strip attached about an outer edge of the flighting of the auger member of the ice auger, and a deflector member attached to the upper portion of the flighting. The deflector member pushes the ice debris out from within the interior of the shroud member through the side opening in a desired location.

20 Claims, 7 Drawing Sheets

ICE AUGER SHROUD SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to ice augers and more specifically it relates to an ice auger shroud system for directing debris produced during the drilling of an ice hole in a controlled direction from the operator.

2. Description of the Related Art

Ice augers have been in use for years. A conventional ice auger is typically comprised of a motor, an auger member having a center shaft and a length of flighting attached about the center shaft in a spiral manner, and a cutting structure at the lower end of the center shaft. The cutting structure may be comprised of a single blade or multiple structure as is well known in the art.

The main problem with conventional ice augers is that they disperse the freshly cut ice about the ice hole in all directions making it difficult to freely utilize the ice hole. Another problem with conventional ice augers is that the ice debris is typically thrown upon the individual operating the ice auger. A further problem with conventional ice augers is that they typically require the user to clean out the ice debris from the ice hole after drilling.

Examples of patented devices which are related to the present invention include U.S. Pat. No. 3,382,935 to Watts; U.S. Pat. No. 3,025,917 to Knoblauch; U.S. Pat. No. 1,857,585 to Brooks, Sr.; U.S. Pat. No. 2,723,835 to Reese et al.; U.S. Pat. No. 4,854,396 to Burch; U.S. Pat. No. 4,539,750 to Jarvi et al.; U.S. Pat. No. 5,330,014 to Wagner; U.S. Pat. No. 5,873,419 to Berry et al.; U.S. Pat. No. 6,076,617 to Berner.

While these devices may be suitable for the particular purpose to which they address, they are not as suitable for directing debris produced during the drilling of an ice hole in a controlled direction from the operator. Conventional ice auger devices do not adequately dispense the freshly cut ice debris in a convenient manner.

In these respects, the ice auger shroud system according to the present invention substantially departs from the conventional concepts and designs of the prior art, and in so doing provides an apparatus primarily developed for the purpose of directing debris produced during the drilling of an ice hole in a controlled direction from the operator.

BRIEF SUMMARY OF THE INVENTION

In view of the foregoing disadvantages inherent in the known types of ice augers now present in the prior art, the present invention provides a new ice auger shroud system construction wherein the same can be utilized for directing debris produced during the drilling of an ice hole in a controlled direction from the operator.

The general purpose of the present invention, which will be described subsequently in greater detail, is to provide a new ice auger shroud system that has many of the advantages of the ice augers mentioned heretofore and many novel features that result in a new ice auger shroud system which is not anticipated, rendered obvious, suggested, or even implied by any of the prior art ice augers, either alone or in any combination thereof.

To attain this, the present invention generally comprises a shroud member comprised of an elongate tubular structure having a first end and a second end, a side opening within the shroud member, a handle attached to the shroud member, a first strap and a second strap attached to the upper end of the shroud member, an elongate protective strip attached about an outer edge of the flighting of the auger member of the ice auger, and a deflector member attached to the upper portion of the flighting. The deflector member pushes the ice debris out from within the interior of the shroud member through the side opening in a desired location.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an ice auger shroud system that will overcome the shortcomings of the prior art devices.

A second object is to provide an ice auger shroud system for directing debris produced during the drilling of an ice hole in a controlled direction from the operator.

Another object is to provide an ice auger shroud system that does not throw ice debris upon the user.

An additional object is to provide an ice auger shroud system that provides an ice hole with reduce ice slush within.

A further object is to provide an ice auger shroud system that may be utilized upon various types of ice augers.

Another object is to provide an ice auger shroud system that may be easily attached and removed from an ice auger.

A further object is to provide an ice auger shroud system that encloses the rotating auger member thereby reducing the possibility of an accident.

Another object is to provide an ice auger shroud system that reduces the chances of the auger member binding within an ice hole.

A further object is to provide an ice auger shroud system that reduces the likelihood of ice auger kickback.

Another object is to provide an ice auger shroud system that conveniently dispenses the ice debris in a single convenient location away from the ice hole or directly into a container.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
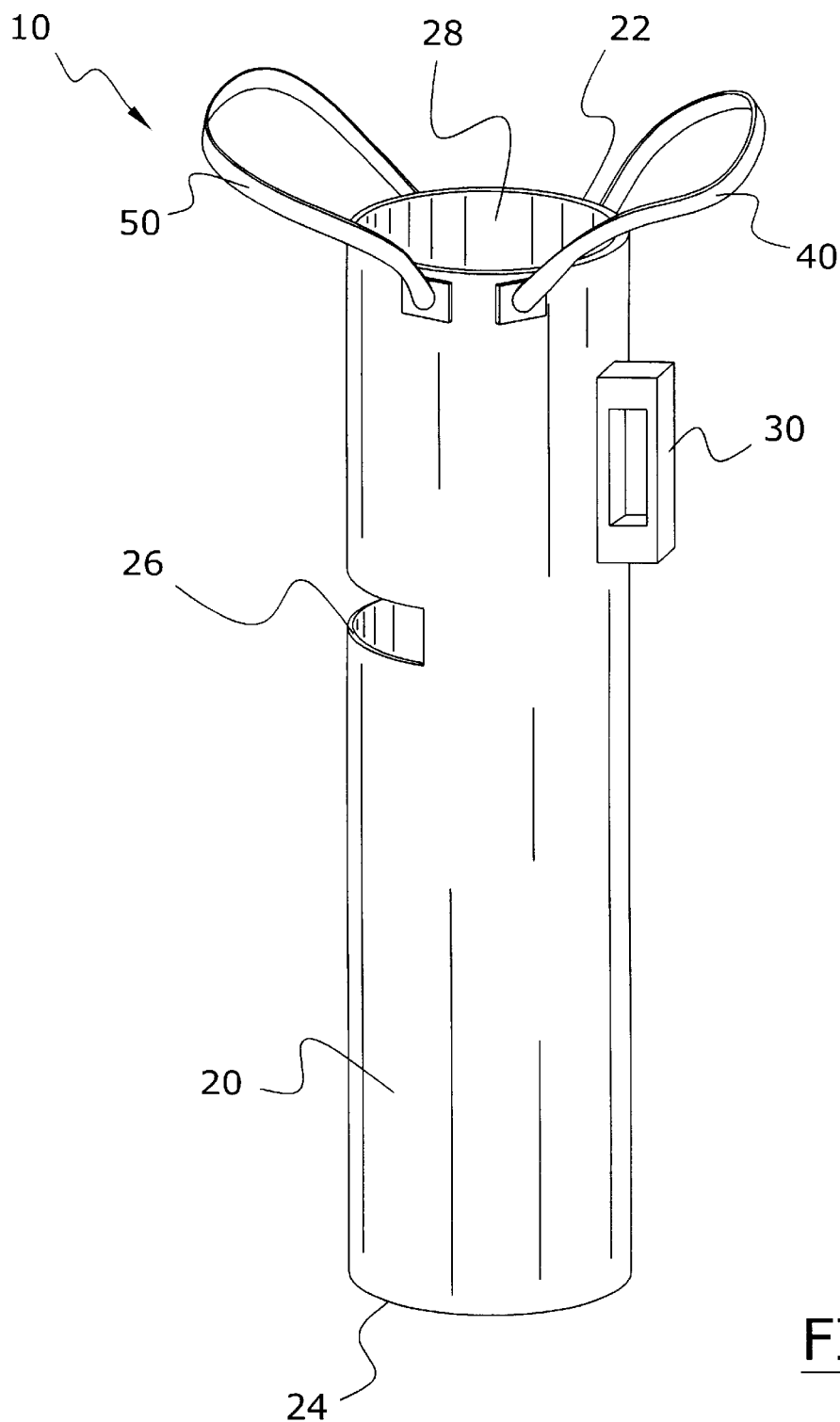
FIG. 1 is an upper perspective view of the present invention.
Figure 2:
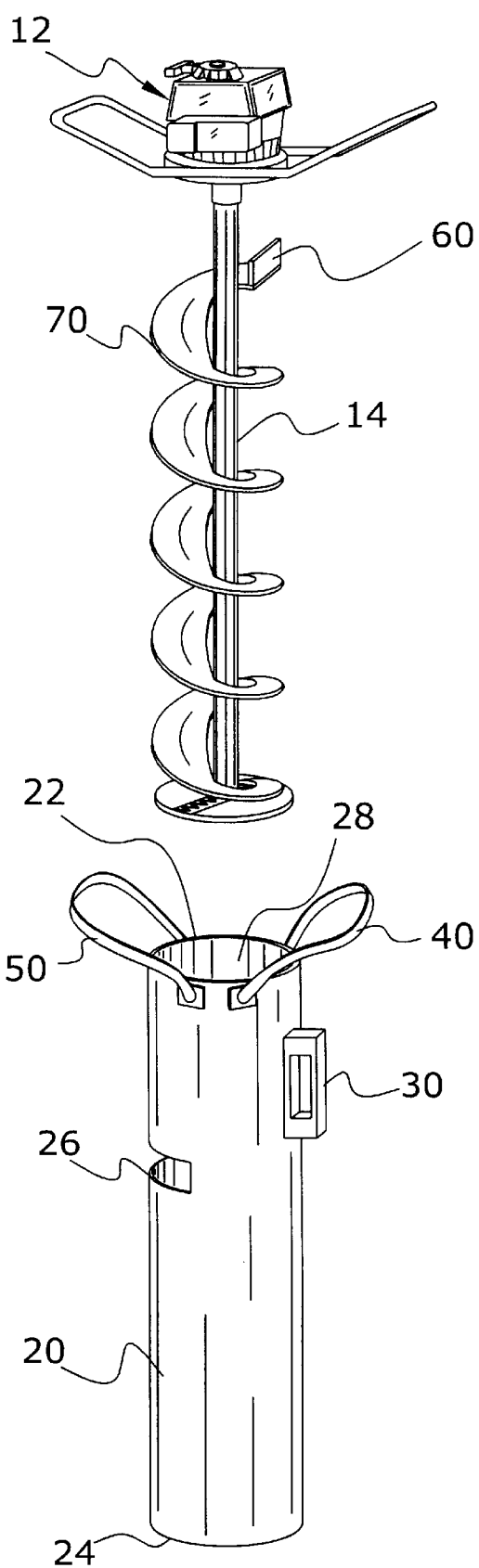
FIG. 2 is an upper perspective view of the present invention with an ice auger positioned above the same.

Turning now descriptively to the drawings, in which similar reference characters denote similar elements throughout the several views, FIGS. 1 through 7 illustrate an ice auger shroud system 10, which comprises a shroud member 20 comprised of an elongate tubular structure having a first end and a second end, a side opening 26 within the shroud member 20, a handle 30 attached to the shroud member 20, a first strap 40 and a second strap 50 attached to the upper end 22 of the shroud member 20, an elongate protective strip 70 attached about an outer edge of the flighting of the auger member 14 of the ice auger 12, and a deflector member 60 attached to the upper portion of the flighting. The deflector member 60 pushes the ice debris out from within the interior of the shroud member 20 through the side opening 26 in a desired location.

FIGS. 1, 2, 4, 5 and 7 illustrate the shroud member 20 as having an elongate tubular structure with an upper end 22 and a lower end 24. The ends 22, 24 of the shroud member 20 are open for receiving the auger member 14 of the ice auger 12.

Figure 5:
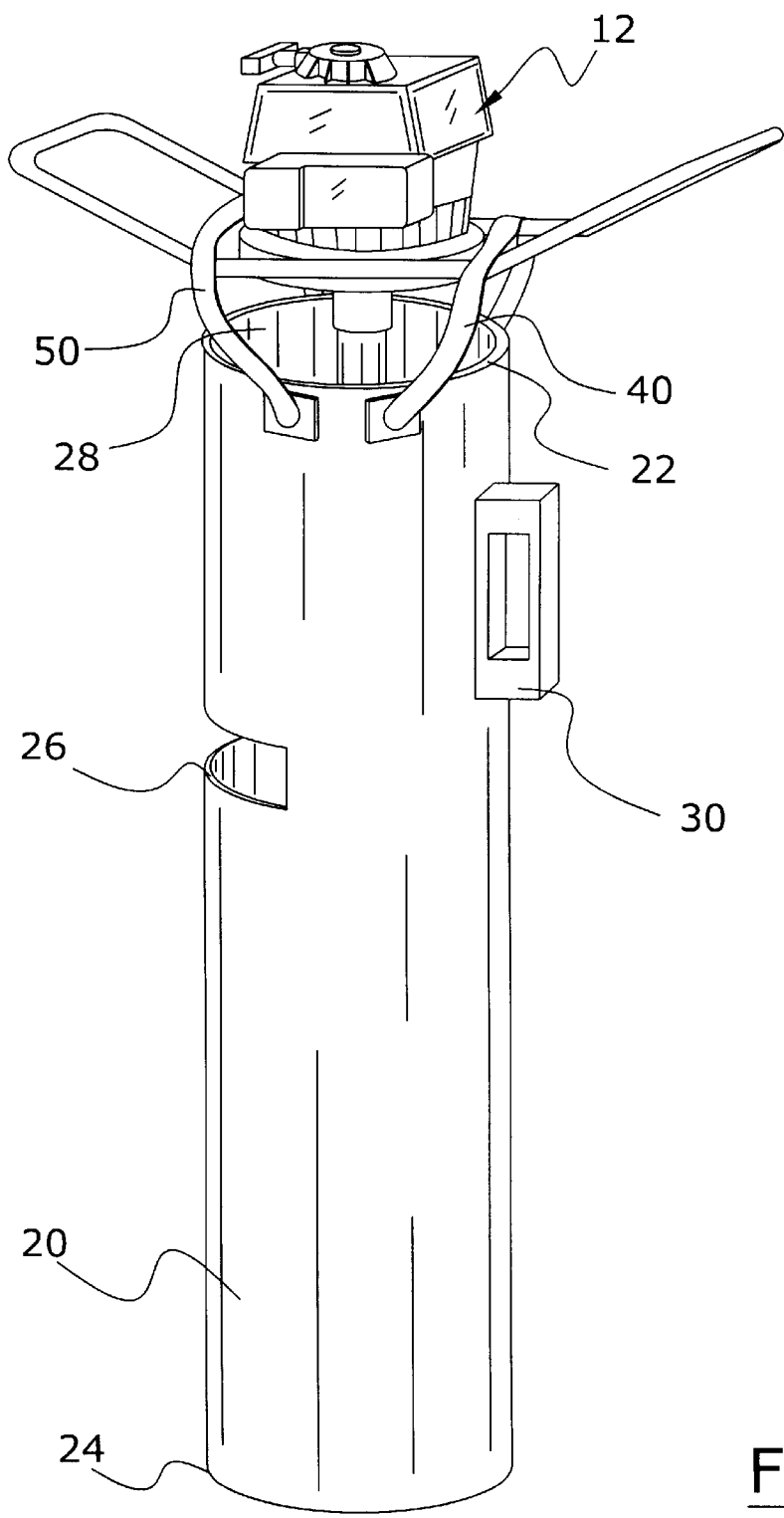
FIG. 5 is an upper perspective view of an ice auger fully positioned within the shroud member and the straps attached to the handles of the ice auger.
Figure 6:
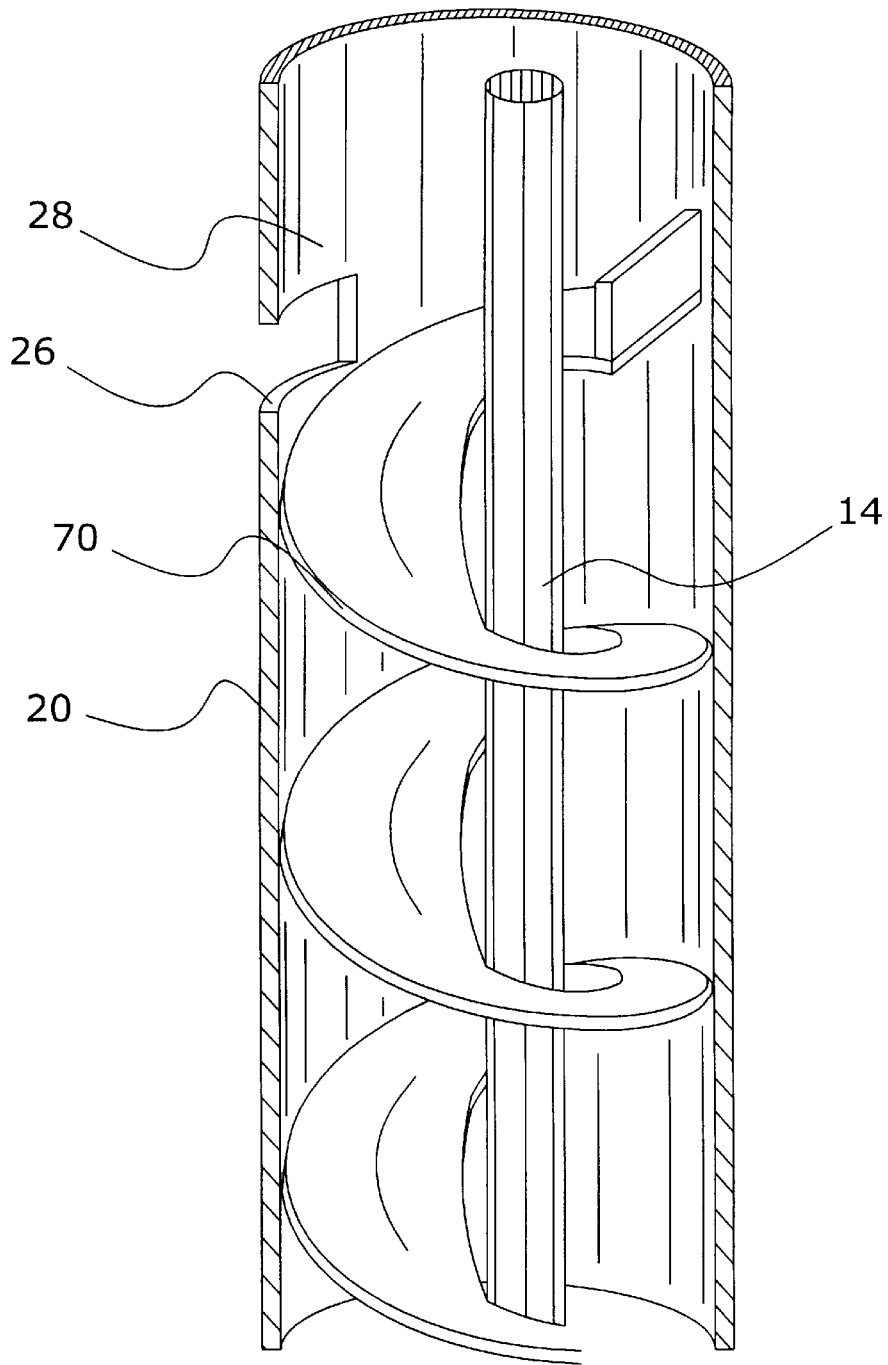
FIG. 6 is an upper perspective cutaway view of the auger member within the shroud member.

The shroud member 20 has a circular cross sectional area with a lumen 28 within the interior portion thereof that the auger member 14 extends within as shown in FIGS. 1 and 5 of the drawings. The inner diameter of the shroud member 20 is dependent upon the diameter of the flighting of the auger member 14 such that little space exists between the flighting and the lumen 28 of the shroud member 20 as shown in FIG. 6 of the drawings. The outer diameter of the shroud member 20 is equal to or less than the inner diameter of a ice hole cut by the auger member 14 to allow passing into the ice hole during cutting of the ice hole. The length of the shroud member 20 is dependent upon the overall length of the auger member 14 as the length of the shroud member 20 is preferably greater than the length of the base of the auger member 14 (location of cutting) to the upper most portion of the flighting. The shroud member 20 is preferably comprised of a plastic material, however various other materials may be utilized to construct the shroud member 20.

As shown in FIGS. 1, 2, 4, 5, 6 and 7 of the drawings, a side opening 26 extends into an upper portion of the shroud member 20 for dispensing the cut ice debris. The side opening 26 is preferably positioned approximately the height of the upper most portion of the flighting as illustrated in FIG. 6 of the drawings. The side opening 26 is preferably comprised of an elongated slot structure as shown in FIGS. 1, 2, 4, 5, 6 and 7 of the drawings, however the side opening 26 may be comprised of various other shapes, sizes and structures suitable for allowing the ice debris to pass through.

As shown in FIGS. 1, 2, 4, 5 and 7 of the drawings, a first strap 40 and a second strap 50 are attached to the upper end 22 of the shroud member 20 for attaching to the ice auger 12. The first strap 40 and the second strap 50 are preferably sufficient in size to extend about the U-shaped handle structure of the ice auger 12 such that the shroud member 20 is supported with respect to the ice auger 12. The first strap 40 and the second strap 50 are preferably comprised of a secured loop structure as shown in FIG. 1 of the drawings, however the straps 40, 50 may be comprised of various other structures capable of being removed and attached to the ice auger 12. The straps 40, 50 are preferably comprised of a rigid material such as metal to prevent rotation of the shroud member 20 during operation, however a flexible material such as plastic may also be utilized.

In addition, at least one handle member 30 is preferably attached to the outer surface of the shroud member 20 for assisting in handling of the shroud member 20. The handle member 30 may have a C-shaped structure or other suitable structure for grasping with a hand. The handle member 30 may be permanently or removably attached to the shroud member 20 wherein the handle member 30 is removed for deep hole drilling.

Figure 3:
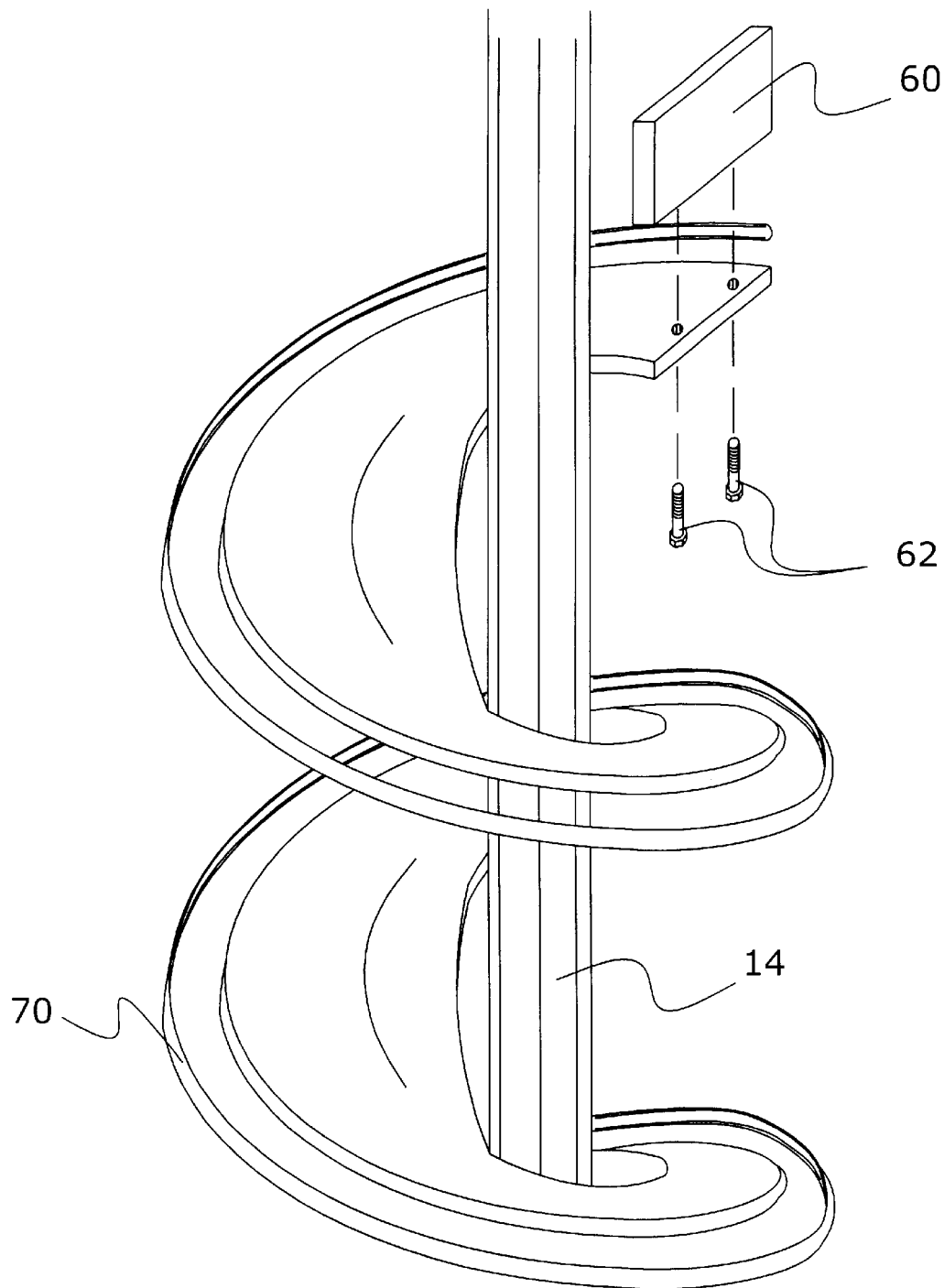
FIG. 3 is an exploded magnified upper perspective view of the upper portion of the auger member, the deflector member, and the elongate protective strip.
Figure 4:
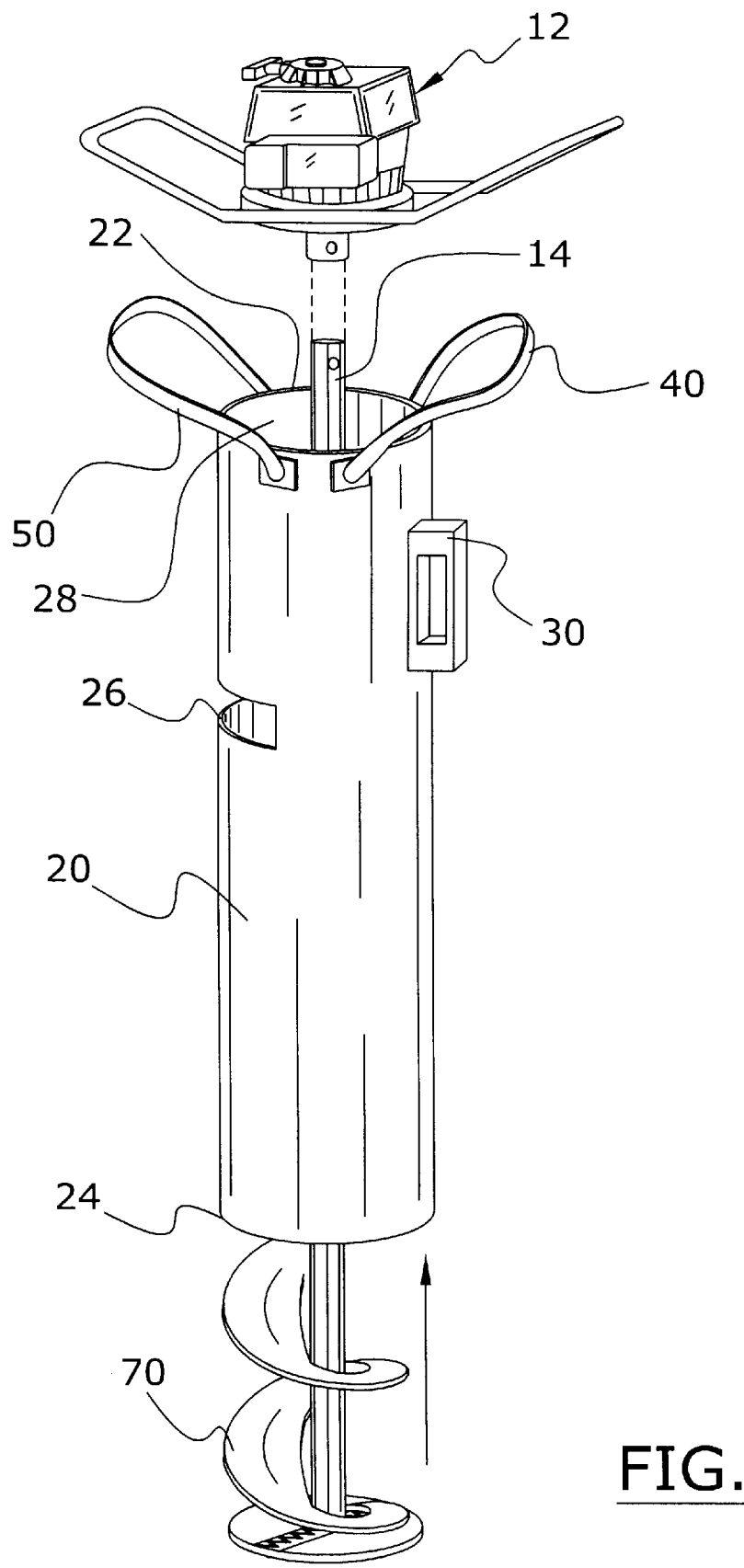
FIG. 4 is an upper perspective view of an ice auger partially positioned within the shroud member.

As shown in FIGS. 3 and 6 of the drawings, a deflector member 60 is attached transversely to the upper most portion of the flighting of the auger member 14 for forcing the elevated ice debris outwardly through the side opening 26 of the shroud member 20. The deflector member 60 may be attached to the flighting via various conventional means including one or more fasteners 62 extending through holes within the flighting. The deflector member 60 may have various heights as required to ensure that the ice debris does not pass over the deflector member 60.

As best shown in FIGS. 3 and 6 of the drawings, an elongate protective strip 70 having a C-shaped cross sectional area is attached about the outer perimeter of the flighting of the auger member 14 to protect the interior portion of the shroud member 20 from damage. The elongate protective strip 70 is preferably comprised of a low friction material such as but not limited to plastic and may be attached to the flighting via an adhesive or other securing system.

Figure 7:
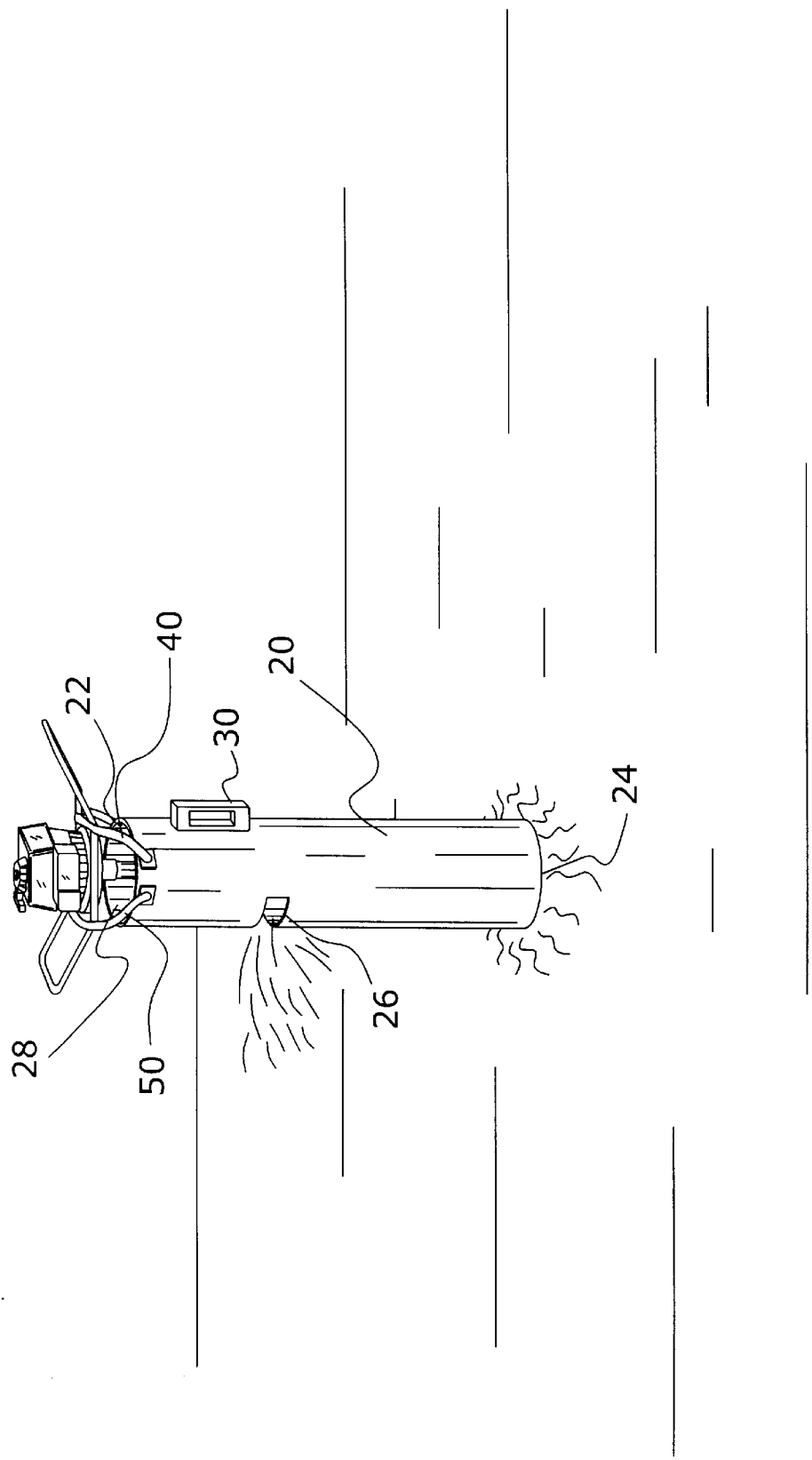
FIG. 7 is an upper perspective view of the present invention attached about the ice auger with the ice auger drilling an ice hole.

In use, the user positions the auger member 14 within the shroud member 20 through the lower end 24. The user then attaches the ice auger 12 to the auger member 14 along with positioning the straps 40, 50 about the U-shaped handle structure of the ice auger 12 as shown in FIGS. 5 and 7 of the drawings. The user then operates the ice auger 12 in the desired location upon the ice with the auger member 14 being freely rotated within the shroud member 20. The cutting portion of the ice auger 12 is positioned beneath the lower end 24 of shroud member 20 to allow for unobstructed cutting of the ice and extends a finite distance outwardly from the outer surface of the shroud member 20. As the auger member 14 cuts into the ice, the ice debris is elevated upwardly within the flighting of the auger member 14 and within the shroud member 20. As the ice debris is near the upper most portion of the flighting, the deflector member 60 pushes the ice debris outwardly through the side opening 26 within the shroud member 20. It can be appreciated that more than one side opening 26 may be included within the shroud member 20 to dispense the ice debris from. The user continues this process with the shroud member 20 proceeding downwardly with the auger member 14 of the ice auger 12 within the newly created ice hole while conveniently dispensing the ice debris. When finished, the user removes the ice auger 12 and the shroud member 20 from the ice hole and performs any cleaning duties required to further clean the ice hole.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice auger shroud system for surrounding an auger member of an ice auger for directing ice debris to a specified location, comprising:
    a shroud member having an elongate tubular structure;
    a side opening within said shroud member; and
    a plurality of straps attached to an upper end of said shroud member.

2. The ice auger shroud system of claim 1, wherein said plurality of straps are comprised of a looped structure.

3. The ice auger shroud system of claim 2, wherein said plurality of straps are comprised of a flexible material.

4. The ice auger shroud system of claim 1, wherein said plurality of straps are comprised of a first strap and a second strap.

5. The ice auger shroud system of claim 4, wherein said first strap and said second strap are comprised of a looped structure.

6. The ice auger shroud system of claim 1, wherein said shroud member has a length greater than a height of flighting of said auger member.

7. The ice auger shroud system of claim 1, wherein said side opening is positioned within an upper portion of said shroud member.

8. The ice auger shroud system of claim 7, wherein said side opening is positioned substantially equal in height to an upper most portion of flighting of said auger member.

9. The ice auger shroud system of claim 1, including a deflector member attached to an upper most portion of flighting of said auger member.

10. The ice auger shroud system of claim 1, including a length of an elongate protective strip attached about an outer perimeter of flighting of said auger member.

11. An ice auger shroud system for surrounding an auger member of an ice auger for directing ice debris to a specified location, comprising:
    a shroud member having an elongate tubular structure;
    a handle member attached to said shroud member;
    a side opening within said shroud member; and
    a plurality of straps attached to an upper end of said shroud member.

12. The ice auger shroud system of claim 11, wherein said plurality of straps are comprised of a looped structure.

13. The ice auger shroud system of claim 12, wherein said plurality of straps are comprised of a flexible material.

14. The ice auger shroud system of claim 11, wherein said plurality of straps are comprised of a first strap and a second strap.

15. The ice auger shroud system of claim 14, wherein said first strap and said second strap are comprised of a looped structure.

16. The ice auger shroud system of claim 11, wherein said shroud member has a length greater than a height of flighting of said auger member.

17. The ice auger shroud system of claim 11, wherein said side opening is positioned within an upper portion of said shroud member.

18. The ice auger shroud system of claim 17, wherein said side opening is positioned substantially equal in height to an upper most portion of flighting of said auger member.

19. The ice auger shroud system of claim 11, including a deflector member attached to an upper most portion of flighting of said auger member.

20. The ice auger shroud system of claim 11, including a length of an elongate protective strip attached about an outer perimeter of flighting of said auger member.

* * * * *